(12) United States Patent
Ohmura

(10) Patent No.: US 10,870,141 B2
(45) Date of Patent: Dec. 22, 2020

(54) SHOCK ABSORBER AND PRESS APPARATUS USING THE SAME

(71) Applicant: Koganei Corporation, Koganei (JP)

(72) Inventor: Yuta Ohmura, Koganei (JP)

(73) Assignee: KOGANEI CORPORATION, Tokyo (JP)

( * ) Notice: Subject to any disclaimer, the term of this patent is extended or adjusted under 35 U.S.C. 154(b) by 334 days.

(21) Appl. No.: 15/573,923

(22) PCT Filed: Jan. 7, 2016

(86) PCT No.: PCT/JP2016/050312
§ 371 (c)(1),
(2) Date: Nov. 14, 2017

(87) PCT Pub. No.: WO2016/194394
PCT Pub. Date: Dec. 8, 2016

(65) Prior Publication Data
US 2018/0290196 A1 Oct. 11, 2018

(30) Foreign Application Priority Data

Jun. 3, 2015 (JP) ................................. 2015-113122

(51) Int. Cl.
*B21D 37/14* (2006.01)
*B21D 24/04* (2006.01)
(Continued)

(52) U.S. Cl.
CPC ............. *B21D 37/14* (2013.01); *B21D 22/02* (2013.01); *B21D 24/02* (2013.01); *B21D 24/04* (2013.01); *B30B 15/062* (2013.01); *F16F 9/20* (2013.01)

(58) Field of Classification Search
CPC ........ B21D 22/02; B21D 24/02; B21D 24/04; B21D 37/10; B21D 37/14; B21D 22/06;
(Continued)

(56) References Cited

U.S. PATENT DOCUMENTS 4,838,527 A * 6/1989 Holley .................. F16F 9/3264
137/596
5,065,607 A * 11/1991 Kadis ..................... B21D 22/22
267/119
(Continued)

FOREIGN PATENT DOCUMENTS

CN 103327102 A 9/2013
JP S61-152399 U1 9/1986
(Continued)

OTHER PUBLICATIONS

Translation of JP 2011-156548—Yamauchi—Translated in 2019 (Year: 2011).*
(Continued)

*Primary Examiner* — Debra M Sullivan
*Assistant Examiner* — Matthew Kresse
(74) *Attorney, Agent, or Firm* — McCormick, Paulding & Huber PLLC

(57) ABSTRACT

Shock absorbers (33) are attached to a press apparatus (10). The press apparatus (10) has a lower die unit (11) and an upper die unit (21) that is movable in vertical directions; the lower die unit and the upper die unit are capable of cooperating with each other to perform press-forming on a blank (W). The upper die unit (21) has an upper forming die (22) that serves as a forming die to perform press-forming on the blank (W) and upper blank holders (25) that partially serve as blank holders. The shock absorbers (33) are respectively disposed between the upper forming die (22) and the upper blank holders (25), and when the upper die unit (21) is
(Continued)

moved upward away from the lower die unit (11) to open the upper and lower forming dies after press-forming is performed on the blank (W), impact applied to the upper blank holders (25) by the upper forming die (22) are respectively absorbed by the shock absorbers (33).

10 Claims, 13 Drawing Sheets

(51) Int. Cl.
  *B21D 24/02*  (2006.01)
  *F16F 9/20*  (2006.01)
  *B30B 15/06*  (2006.01)
  *B21D 22/02*  (2006.01)

(58) Field of Classification Search
  CPC ........ B21D 22/08; B21D 24/14; B21D 24/08; B30B 15/02; B30B 15/026; B30B 15/062; B30B 15/06; B30B 15/061; B30B 15/065; F16F 9/20; F16F 9/3242; F16F 2230/0005; F16F 5/00; F16F 9/49; F16F 9/58; F16F 9/585; F16F 7/08; F16F 7/082; F16F 7/09; Y10S 100/918; B61F 5/12; B61F 5/127; B41F 3/78
  USPC ............. 188/321.11; 267/130, 119; 254/254; 74/573.1, 572.2
  See application file for complete search history.

(56) References Cited

U.S. PATENT DOCUMENTS

| | | | |
|---|---|---|---|
| 6,068,245 | A | 5/2000 | Roper |
| 6,223,649 | B1* | 5/2001 | Beck ..................... F16F 9/3221 |
| | | | 92/109 |
| 8,181,756 | B2* | 5/2012 | Horikawa ................. F16F 9/20 |
| | | | 188/312 |
| 2009/0139812 | A1 | 6/2009 | Olsson et al. |
| 2009/0311361 | A1* | 12/2009 | Hirotani .................. F16F 9/182 |
| | | | 425/412 |
| 2014/0090938 | A1 | 4/2014 | Nishimura |

FOREIGN PATENT DOCUMENTS

| | | |
|---|---|---|
| JP | H10138950 A | 5/1998 |
| JP | H11-179440 A | 7/1999 |
| JP | 2008-534879 A | 8/2008 |
| JP | 2011-156548 A | 8/2011 |
| JP | 2012-157866 A | 8/2012 |

OTHER PUBLICATIONS

International Search Report for PCT Serial No. PCT/JP2016/050312 dated Mar. 24, 2016.

* cited by examiner

SHOCK ABSORBER AND PRESS APPARATUS USING THE SAME

CROSS-REFERENCE TO RELATED APPLICATIONS

This application is a National Stage application of International Patent Application No. PCT/JP2016/050312, filed on Jan. 7, 2016, which claims priority to Japanese Patent Application No. 2015-113122, filed on Jun. 3, 2015, each of which is hereby incorporated by reference in its entirety.

TECHNICAL FIELD

The present invention relates to a shock absorber used in a press apparatus to produce a pressed product from a blank made of a metal sheet by press-forming.

BACKGROUND ART

A pressed product made of a metal panel, or a blank, is produced by a press apparatus. The pressed product made of the blank may include members that partially constitute an automobile body, such as a floor panel, a door panel, a hood panel, and a roof panel. To produce each of these pressed products, the press apparatus is used to form the blank into a desired three-dimensional shape.

The press apparatus has a lower die unit and an upper die unit that is placed above the lower die unit, the upper die unit being movable in vertical directions. The lower die unit comprises a lower blank holder and a lower die main body that includes a punch or the like. The upper die unit comprises an upper blank holder and an upper die main body that includes a die or the like.

A press apparatus described in Japanese Patent Application Laid-Open Publication No. H11-179440 comprises a lower die unit that is attached to a lower die holder, and an upper die unit that is attached to an upper die holder; the upper die unit is made movable in vertical directions by the upper die holder. The lower die unit comprises a lower blank holder and a punch serving as a lower die main body; the upper die unit comprises an upper blank holder and a die serving as an upper die main body. After a blank is placed between the lower die unit and the upper die unit, the upper die unit is moved downward toward the lower die unit, and a main portion of the blank is formed into a three-dimensional shape corresponding to a shape of a product by the die and the punch. When this press-forming is performed on the blank, outside portions of the blank are respectively held by the upper and lower blank holders. The lower blank holder is made movable in vertical directions by a cushion pin; the upper blank holder is suspended by a bolt and is made movable in vertical directions along the die by the bolt. A spring is provided on an upper portion of the upper blank holder, and the spring causes the upper blank holder to press the blank onto the lower blank holder.

A press apparatus described in Japanese Patent Application Laid-Open Publication No. 2012-157866 comprises a lower die unit that is attached to a punch holder, and an upper die unit that is attached to a die holder; the lower die unit comprises a punch and a blank holder, the upper die unit comprises a die that cooperates with the punch to perform press-forming on the blank, and a blank holder is integrally provided on the die.

SUMMARY OF THE INVENTION

According to the press apparatuses described in Japanese Patent Application Laid-Open Publication No. H11-179440 and Japanese Patent Application Laid-Open Publication No. 2012-157866, the punch with a convex forming surface is provided on the lower die unit, and the die with a concave forming surface is provided on the upper die unit. In contrast, a different type of press apparatus may have a structure in which the punch is provided on the upper die unit, and the die is provided on the lower die unit. In each of these types of press apparatuses, the punch and the die partially constitute respective product forming portions, or forming dies, for deformation of the blank. In addition, another type of press apparatus that is different from the press apparatuses described in Japanese Patent Application Laid-Open Publication No. H11-179440 and Japanese Patent Application Laid-Open Publication No. 2012-157866 may have a structure in which the lower blank holder is made movable in vertical directions by a bolt, and an upward pressing force of a spring or a rubber member is applied to the lower blank holder.

In the press apparatus of the type as described in Japanese Patent Application Laid-Open Publication No. H11-179440, the upper blank holder is attached by the bolt and is made movable in vertical directions by the bolt. When the upper die unit is moved upward to open the upper and lower forming dies, a head of the bolt collides with the upper die holder, thereby generating an impact. In the press apparatus of the other type in which the upward pressing force of the spring or the rubber member is applied to the lower blank holder, a head of the bolt collides with the lower blank holder when opening the upper and lower forming dies, thereby generating a strong impact.

In this manner, when opening the upper and lower forming dies, impact is generated by collision between the blank holder and the forming die, such as the die or the punch, which causes the die units and other components to gradually degrade and ultimately break. As a countermeasure against breakage, speed to move the upper die unit upward can be slowed down; however, this causes the number of items produced per unit time to decrease, and thus, productivity cannot be improved. Additionally, the impact may be alleviated by an elastic member such as a spring or a rubber member. Such an elastic member deforms to convert kinetic energy into thermal energy and energy to be accumulated in the elastic member itself. Since the accumulated energy is greater than the thermal energy, such an elastic member would have a shortened life and would need to be replaced frequently.

An object of the present invention is to provide a shock absorber that alleviates impact generated by collision between a die unit and a blank holder when opening the upper and lower forming dies.

Another object of the present invention is to provide a press apparatus capable of increasing the number of items produced per unit time.

Another object of the present invention is to provide a press apparatus that is highly durable and has high productivity.

According to one aspect of the present invention, there is provided a shock absorber that is mounted on a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, the shock absorber being utilized for absorbing impact applied to the upper blank holder by the upper forming die when opening the upper and lower forming dies, the shock absorber comprising: a case that is attached vertically to either one of the upper blank holder and the upper forming die; a piston rod that is disposed inside the case, is movable inside the case, and has a protruding end capable of abutting on a rod abutting surface provided on the other of the upper blank holder and the upper forming die; and a piston that is provided on the piston rod and is movable through oil filled in the case.

According to another aspect of the present invention, there is provided a shock absorber that is mounted on a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, the shock absorber being utilized for absorbing impact applied to the upper blank holder by the upper forming die when opening the upper and lower forming dies, the shock absorber comprising: a hollow piston rod through which a support rod extends, the support rod being attached vertically to either one of the upper blank holder and the upper forming die; a case that has the hollow piston rod disposed therein, is provided with a die abutting surface capable of abutting on either one of the upper blank holder and the upper forming die, and is movable relative to the hollow piston rod; a piston that is provided on the hollow piston rod and is movable through oil filled in the case; and a rod abutting surface that is provided on the hollow piston rod and is capable of abutting on a head portion of the support rod.

According to another aspect of the present invention, there is provided a shock absorber that is mounted on a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, the shock absorber being utilized for absorbing impact applied to the lower forming die by the lower blank holder when opening the upper and lower forming dies, the shock absorber comprising: a hollow piston rod through which a support rod extends, the support rod being attached vertically to the lower forming die; a case that has the hollow piston rod disposed therein, is provided with a die abutting surface capable of abutting on the lower blank holder, and is movable relative to the hollow piston rod; a piston that is provided on the hollow piston rod and is movable through oil filled in the case; and a rod abutting surface that is provided on the hollow piston rod and is capable of abutting on a head portion of the support rod.

According to another aspect of the present invention, there is provided a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, wherein a shock absorber is disposed between the upper forming die and the upper blank holder, and is utilized for absorbing impact applied to the upper blank holder by the upper forming die when the upper die unit is moved upward away from the lower die unit to open the upper and lower forming dies after press-forming is performed on the blank.

According to another aspect of the present invention, there is provided a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, wherein a shock absorber is disposed between the lower forming die and the lower blank holder and is utilized for absorbing impact applied to the lower forming die by the lower blank holder when the upper die unit is moved upward away from the lower die unit to open the upper and lower forming dies after press-forming is performed on the blank.

When the upper die unit is moved upward away from the lower die unit to open the upper and lower forming dies after press-forming is performed on the blank, impact caused by collision between the blank holder and the die unit is absorbed by the shock absorber. That is, since the impact which occurs when opening the upper and lower forming dies is suppressed, speed to collision is increased. Therefore, tact time is shortened, and the number of items produced per unit time is increased. The shock absorber has a function for converting impact energy applied to the shock absorber when opening the upper and lower forming dies to thermal energy, and the thermal energy is conducted through the die unit and is dissipated. The shock absorber has a high heat dissipating property which prevents the shock absorber from being overheated even when pressing is repeated, and thus, the shock absorber is highly durable.

DETAILED DESCRIPTION OF PREFERRED EMBODIMENTS

Figure 1:
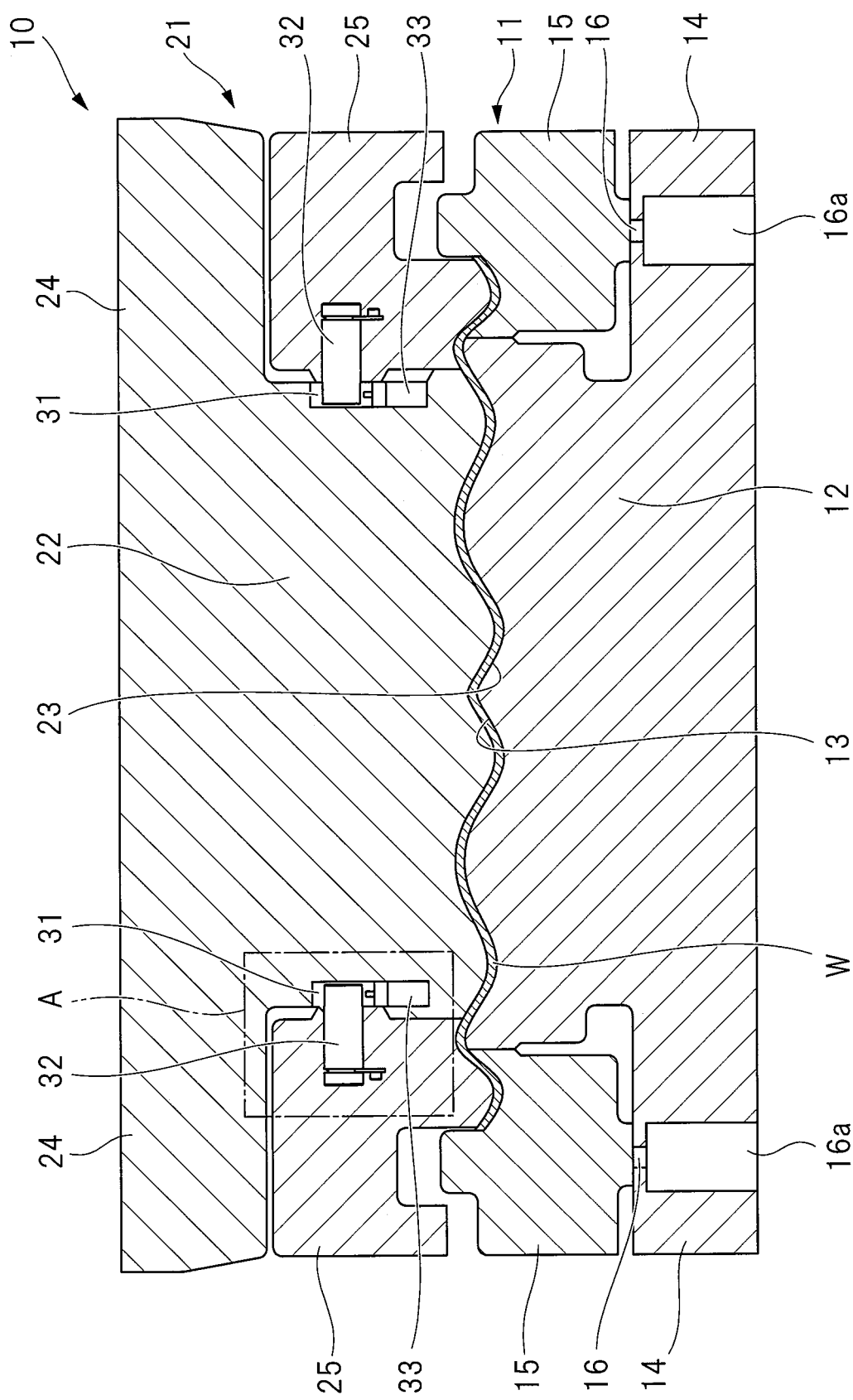
FIG. 1 is a sectional view showing a press apparatus according to an embodiment of the present invention, with a blank being pressed by the press apparatus.

Hereinafter, embodiments of the present invention will be described in detail with reference to the drawings. In the drawings, members that have the same properties as each other are denoted by the same reference numerals.

A press apparatus 10 shown in FIG. 1 has a lower die unit 11 and an upper die unit 21 that is movable in vertical directions relative to the lower die unit 11. The lower die unit 11 is attached to a support base (not shown), and the upper die unit 21 is attached to another support base that includes a ram cylinder or the like (not shown) serving as a vertical driving member; the upper die unit 21 is made movable in vertical directions by the ram cylinder.

The lower die unit 11 comprises a lower forming die 12 that has a product-forming surface 13. The upper die unit 21 comprises an upper forming die 22 that has a product-forming surface 23. A blank "W" is placed on the lower die unit 11, and when the upper die unit 21 is moved downward toward the lower die unit 11, the product-forming surface 13 of the lower die unit 11 and the product-forming surface 23 of the upper die unit 21 cooperate with each other to form a three-dimensional pressed product by deformation, or press-forming. The product-forming surfaces 13 and 23 are schematically shown in the drawings. If a pressed product having a cup shape in its cross-section is to be formed, the lower forming die 12 is partially constituted by a punch having a convex product-forming surface 13, and the upper forming die 22 is partially constituted by a die having a concave product-forming surface 23.

Lower holder support portions 14 are provided on and are integral with a lower portion of the lower forming die 12. Each lower holder support portion 14 protrudes outward from the lower forming die 12. Lower blank holders 15 are disposed outside of the lower forming die 12, and each lower blank holder 15 is movable in vertical directions along the lower forming die 12. Cushion pins 16 are provided on the respective lower holder support portions 14 and respectively drive the lower blank holders 15 in vertical directions; the cushion pins 16 are driven by respective hydraulic cylinders 16a serving as driving means.

Upper holder support portions 24 are provided on and are integral with an upper portion of the upper forming die 22. Each upper holder support portion 24 protrudes outward from the upper forming die 22 and faces the corresponding lower holder support portion 14. Upper blank holders 25 are disposed outside of the upper forming die 22, and each upper blank holder 25 is movable in vertical directions along the upper forming die 22. To sandwich, or clamp, outside portions of the blank "W" between the lower blank holders 15 and the upper blank holders 25 and maintain this state during pressing, a driving means (not shown) is provided on each upper blank holder 25.

In this manner, the lower die unit 11 comprises the lower forming die 12 serving as a forming die to perform press-forming on the blank "W", and the lower blank holders 15 serving as blank holders to be used for sandwiching the blank "W". Likewise, the upper die unit 21 comprises the upper forming die 22 serving as a forming die to perform press-forming on the blank "W", and the upper blank holders 25 serving as blank holders to be used for sandwiching the blank "W".

As shown in FIG. 1, the lower forming die 12 and the lower holder support portions 14 are integral with each other, and the lower holder support portions 14 partially form the lower forming die 12; however, the lower forming die 12 may be of a structure in which the lower forming die 12 and the lower holder support portions 14 are members separate from each other. In the same manner, the upper forming die 22 may be of a structure in which the upper forming die 22 and the upper holder support portions 24 are members separate from each other.

Figure 3:
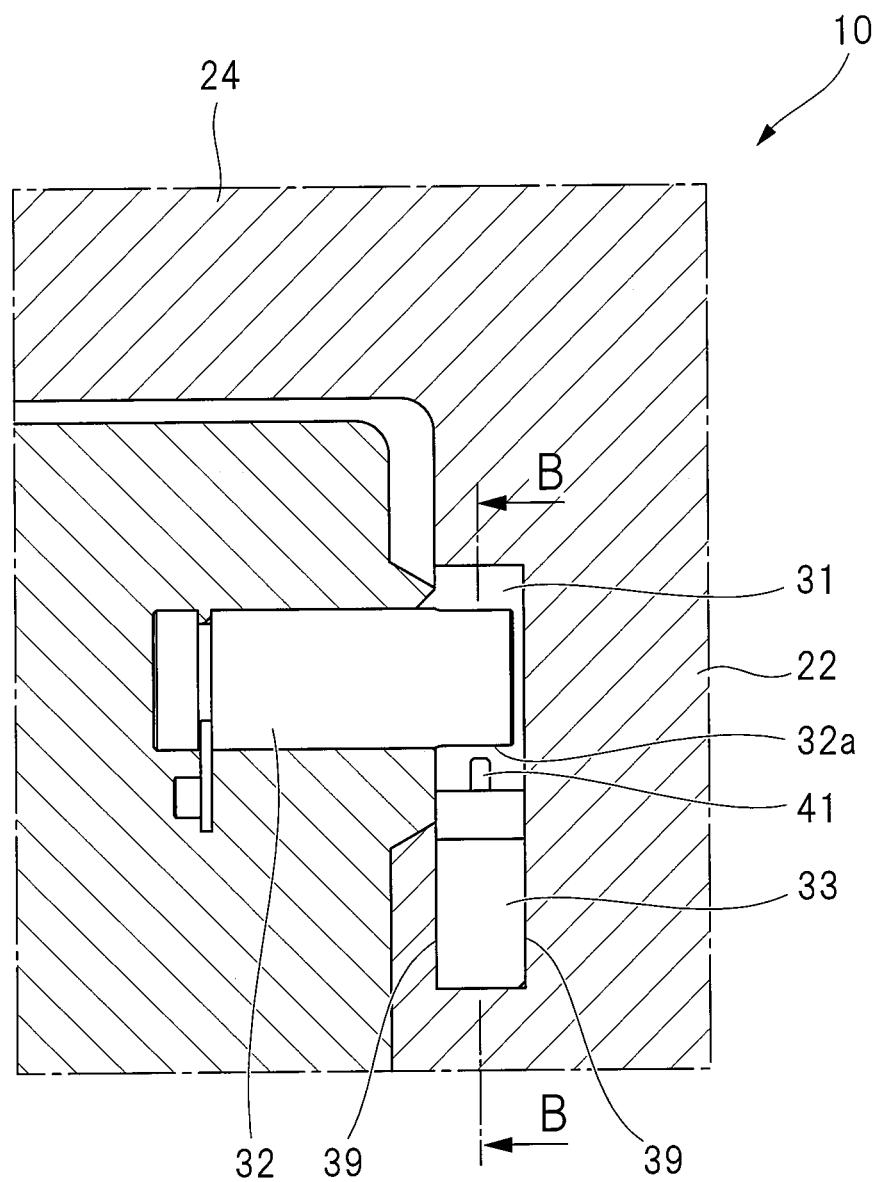
FIG. 3 is an enlarged sectional view of a portion "A" of FIG. 1.

In order to guide vertical movements of the upper blank holders 25, guide grooves 31 are formed on respective outer surfaces of the upper forming die 22 and extend vertically; side pins 32 are attached horizontally to the respective upper blank holders 25 and respectively protrude into the guide grooves 31. Shock absorbers 33 are attached to the upper forming die 22 as shown in FIG. 3. Each shock absorber 33 is disposed inside the corresponding guide groove 31, and is located at a lower position relative to the corresponding side pin 32. A tip end portion of each shock absorber 33 faces upward.

When the blank "W" is to be pressed, the blank "W" is placed on the lower die unit 11 with the upper die unit 21 separated from the lower die unit 11. At this time, each lower blank holder 15 is positioned by the corresponding cushion pin 16 so that a blank abutting surface of each lower blank holder 15 is closer to the upper die unit 21 relative to the product-forming surface 13 of the lower forming die 12. In this state, the upper die unit 21 is driven toward the lower die unit 11. Next, the outside portions of the blank "W" are respectively sandwiched by the lower blank holders 15 and the upper blank holders 25. As shown in FIG. 1, the pressed product is then formed by the product-forming surface 13 and the product-forming surface 23.

Figure 2:
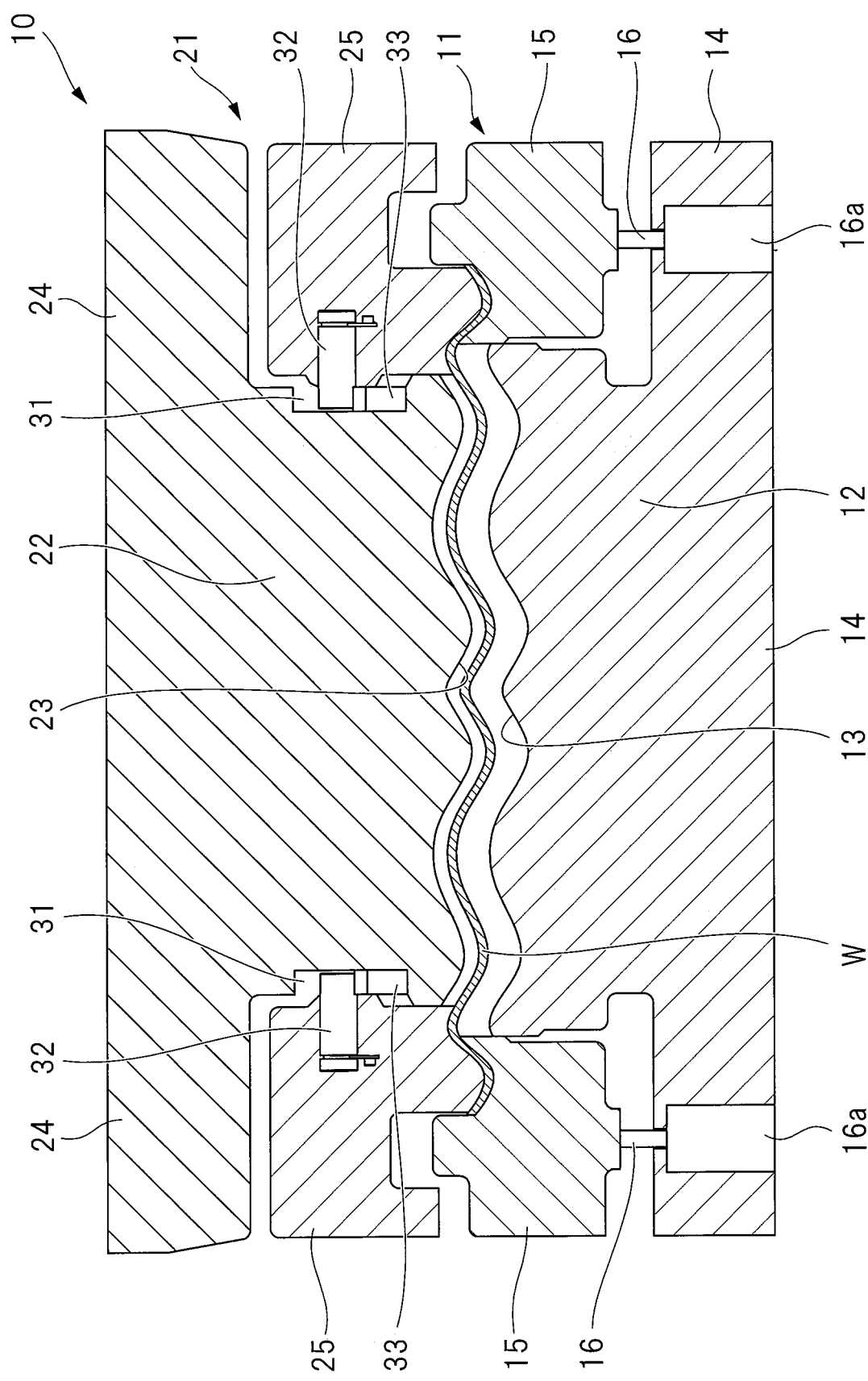
FIG. 2 is a sectional view showing the press apparatus with an upper die unit moved upward away from a lower die unit, and upper and lower forming dies opened.

FIG. 2 shows the press apparatus 10 with the upper die unit 21 moved upward to open the upper and lower forming dies after press-forming is performed on the blank and pressing on the blank is completed. When the upper forming die 22 is moved upward to open the upper and lower forming dies, a piston rod 41 of each shock absorber 33 abuts on the corresponding side pin 32, thereby actuating each shock absorber 33 to absorb impact generated between the corresponding upper blank holder 25 and the upper forming die 22.

Figure 4:
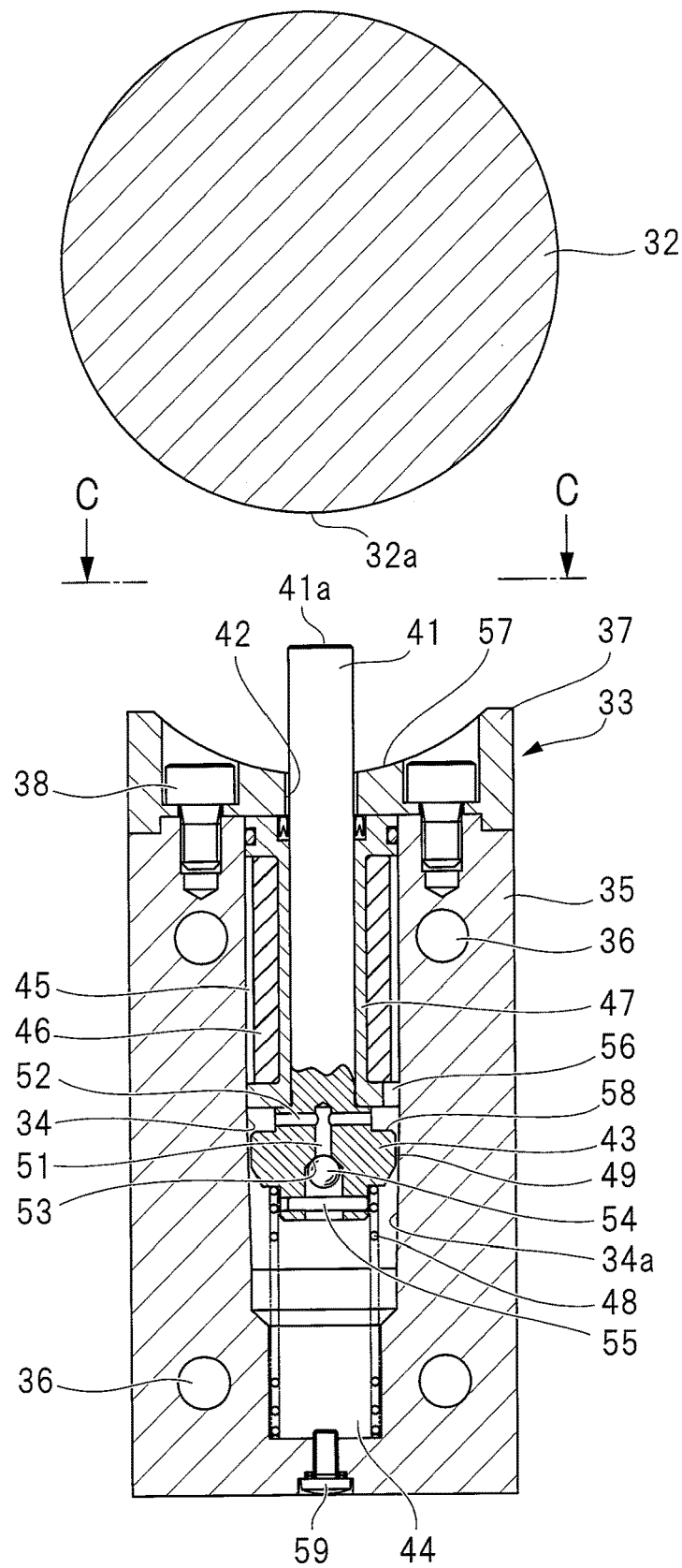
FIG. 4 is an enlarged sectional view taken along a line B-B of FIG. 3.
Figure 5:
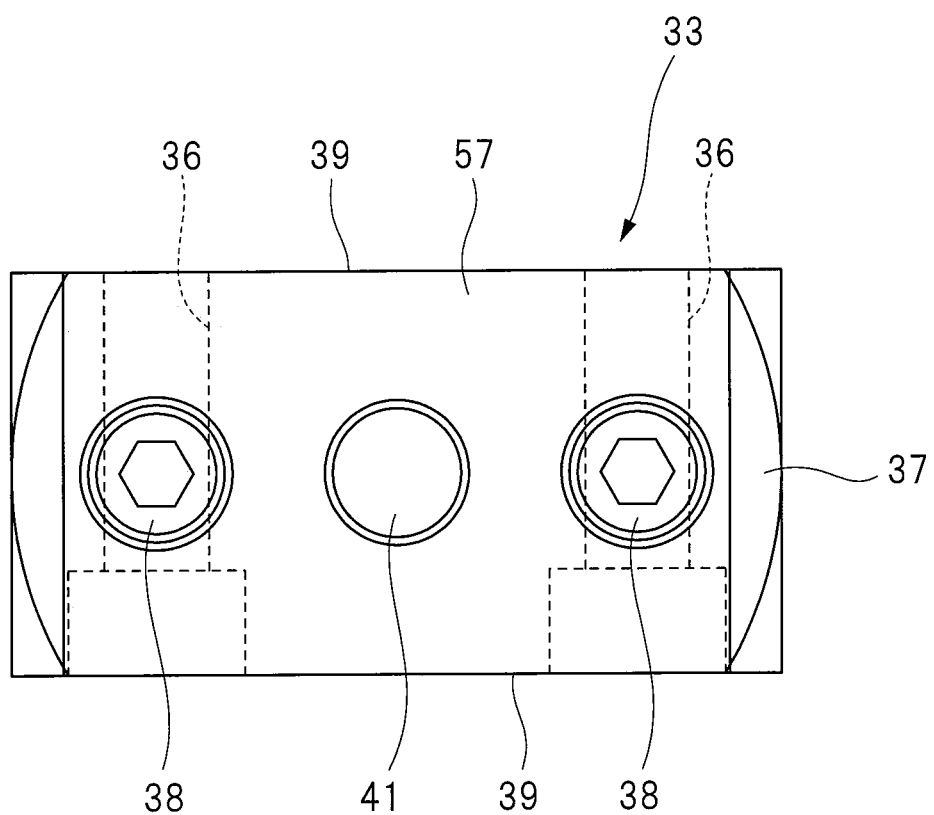
FIG. 5 is an arrow view from a line C-C of FIG. 4.

FIG. 4 is an enlarged sectional view taken along a line B-B of FIG. 3, and FIG. 5 is an arrow view from a line C-C of FIG. 4. As shown in FIG. 4, each shock absorber 33 has a case 35 provided with a bottomed cylindrical hole 34. The case 35 is provided with attaching holes 36, and the shock absorber 33 is fixed to the upper forming die 22 by screw members (not shown) screwed through the respective attaching holes 36. The cylindrical hole 34 is opened at a tip end surface of the case 35, and this opening portion of the cylindrical hole 34 is closed by a rod cover 37 that is attached to the tip end surface of the case 35. The rod cover 37 is attached to the case 35 by screw members 38.

The case 35, the rod cover 37, the piston rod 41 and the like are made of metal, and have high thermal conductivity. As shown in FIG. 5, flat attaching surfaces 39 are respectively provided on outer peripheral surfaces of the case 35, and when the case 35 is fixed to the upper forming die 22 by using the attaching holes 36, the shock absorber 33 is tightly attached to a mounting surface of the upper forming die 22 made of metal. In this manner, the shock absorber 33 has attaching surfaces 39 that are in contact with another member when attached to the upper forming die 22. Therefore, even if the shock absorber 33 is frequently actuated and generates heat, the heat is quickly conducted from the case 35 to the upper forming die 22, and thus, the temperature of the shock absorber 33 is prevented from rising excessively.

As shown in FIG. 4, the piston rod 41 is disposed inside the cylindrical hole 34 and is reciprocally movable through the cylindrical hole 34 in an axial direction thereof. The rod cover 37 is provided with a through hole 42, and the piston rod 41 extends through the through hole 42 and protrudes upward from the case 35. For this shock absorber 33, a side through which the piston rod 41 protrudes is described as a tip end side, and the other side is described as a base end side. A piston 43 is provided on a base end portion of the piston rod 41, and partitions the cylindrical hole 34 into a spring-side oil chamber 44 on a base end side of the case 35 and an accumulator-side oil chamber 45 on a tip end side of the case 35. A sleeve 47 for housing an accumulator 46 is mounted inside the accumulator-side oil chamber 45. The accumulator 46 is formed by material that is capable of being elastically deformed, such as rubber. A compression coil spring 48 is mounted inside the spring-side oil chamber 44. One end of the compression coil spring 48 abuts on a base end wall of the cylindrical hole 34, and the other end of the compression coil spring 48 abuts on the piston 43. The piston rod 41 is urged in a direction to protrude from the tip end of the case 35 by a spring force of the compression coil spring 48.

Oil is filled in the cylindrical hole 34, and the piston 43 is capable of moving through the oil. A gap 49 is formed between the piston 43 and the cylindrical hole 34, and when the piston 43 moves, the oil passes through the gap 49. The cylindrical hole 34 has a portion corresponding to a movement range of the piston 43; a tapered surface 34a is formed on this portion. The tapered surface 34a has an inner diameter that gradually decreases toward its base end side from its tip end side. The piston 43 has a center portion that is provided with a communication hole 51 extending in an axial direction thereof, the communication hole 51 being opened at the spring-side oil chamber 44. The piston rod 41 is provided with a side hole 52. The communication hole 51 and the accumulator-side oil chamber 45 communicate with each other through the side hole 52. An opening portion of the communication hole 51 has a tapered surface 53, and a check valve 54 that is capable of abutting on the tapered surface 53 is attached to the piston 43. The check valve 54 is moved to prevent the oil from flowing from the spring-side oil chamber 44 to the communication hole 51 and to allow the oil to flow in a reverse direction. A steel ball is used as the check valve 54, and a stop pin 55 that is fixed to the piston 43 prevents the check valve 54 from being detached from the piston 43.

The piston rod 41 of the shock absorber 33 attached to the upper forming die 22 has a protruding end 41a. When the upper forming die 22 is moved upward to open the upper and lower forming dies, the protruding end 41a of the piston rod 41 abuts on an outer peripheral surface of the side pin 32, and this piston rod 41 is pushed into the case 35. The protruding end 41a is capable of abutting on a portion corresponding to a rod abutting surface 32a of the side pin 32. When the piston rod 41 is pushed, the piston 43 is driven against the spring force in a direction toward the base end side of the case 35 shown in a lower portion of FIG. 4, and the oil inside the spring-side oil chamber 44 flows into the accumulator-side oil chamber 45 through the gap 49. The gap 49 is comparatively larger on its tip end side relative to its base end side in the axial direction within the movement range of the piston 43. By a flow resistance of the oil passing through the gap 49, the piston rod 41 is gradually pushed into the case 35, while a resistance force of the oil is applied to the piston 43. The oil flows into the accumulator-side oil chamber 45 and passes through a cut-out portion 56, and the accumulator 46 is then contracted by the oil.

The cylindrical hole 34 has a portion corresponding to the movement range of the piston 43; a tapered surface 34 is formed on this portion. Since the inner diameter of the tapered surface 34a gradually decreases toward its base end side from its tip end side, the gap 49 gradually becomes smaller when the piston 43 is driven in a direction toward the base end side from the tip end side of its case 35 against the spring force, and the resistance force applied to the piston 43 gradually increases.

In this manner, since movement of the piston 43 is subjected to the resistance force of the oil and a resistance force caused by elastic contraction of the accumulator 46, impact force applied to the piston 43 is absorbed. Thus, when the upper forming die 22 is moved upward, the impact is absorbed by the shock absorber 33 and is transmitted to the upper blank holder 25 so that the impact force when opening the upper and lower forming dies is suppressed. When the piston 43 moves through the oil, the oil passes through the gap 49 and generates heat. Although the case 35 made of metal is heated by the oil, heat of the case 35 is transmitted to the upper forming die 22 so that the shock absorber 33 is cooled without being overheated. The shock absorber 33 converts impact energy of the piston rod 41 into thermal energy of the oil and exerts a high heat dissipating property; thus, durability of the shock absorber 33 is improved.

An arcuate concave surface 57 corresponding to the outer peripheral surface of the side pin 32 is formed on the rod cover 37 of the shock absorber 33. The concave surface 57 has a bottom portion that is provided with the through hole 42. When the piston rod 41 is pushed into the case 35 to its farthest point, the side pin 32 abuts on the concave surface 57. Since the concave surface 57 is provided on the rod cover 37, the side pin 32 is guided by the concave surface 57 so that a lateral center portion of an outer surface of this side pin 32 abuts on a center portion of the piston rod 41. The piston rod 41 protrudes from a deepest position, or the bottom portion, of the concave surface 57.

When the side pin 32 is separated from the piston rod 41, this piston rod 41 is driven in a direction to protrude from the case 35 by the spring force of the compression coil spring 48. At this time, the check valve 54 is moved to separate from the tapered surface 53, and the oil inside the accumulator-side oil chamber 45 flows through the gap 49 and the communication hole 51 at the same time, and further moves into the spring-side oil chamber 44. In this manner, when the piston rod 41 is to be driven to protrude from the case 35, the oil inside the accumulator-side oil chamber 45 flows through the gap 49 and the communication hole 51 at the same time and further moves into the spring-side oil chamber 44, causing a quick protruding movement of the piston rod 41. A stopper surface 58 that is capable of abutting on the sleeve 47 is provided on the piston 43, and when the stopper surface 58 abuts on the sleeve 47, the piston 43 is located at a protrusion limit position. Reference numeral 59 denotes a sealing plug that seals an injection inlet used to inject the oil into the case 35.

Figure 6:
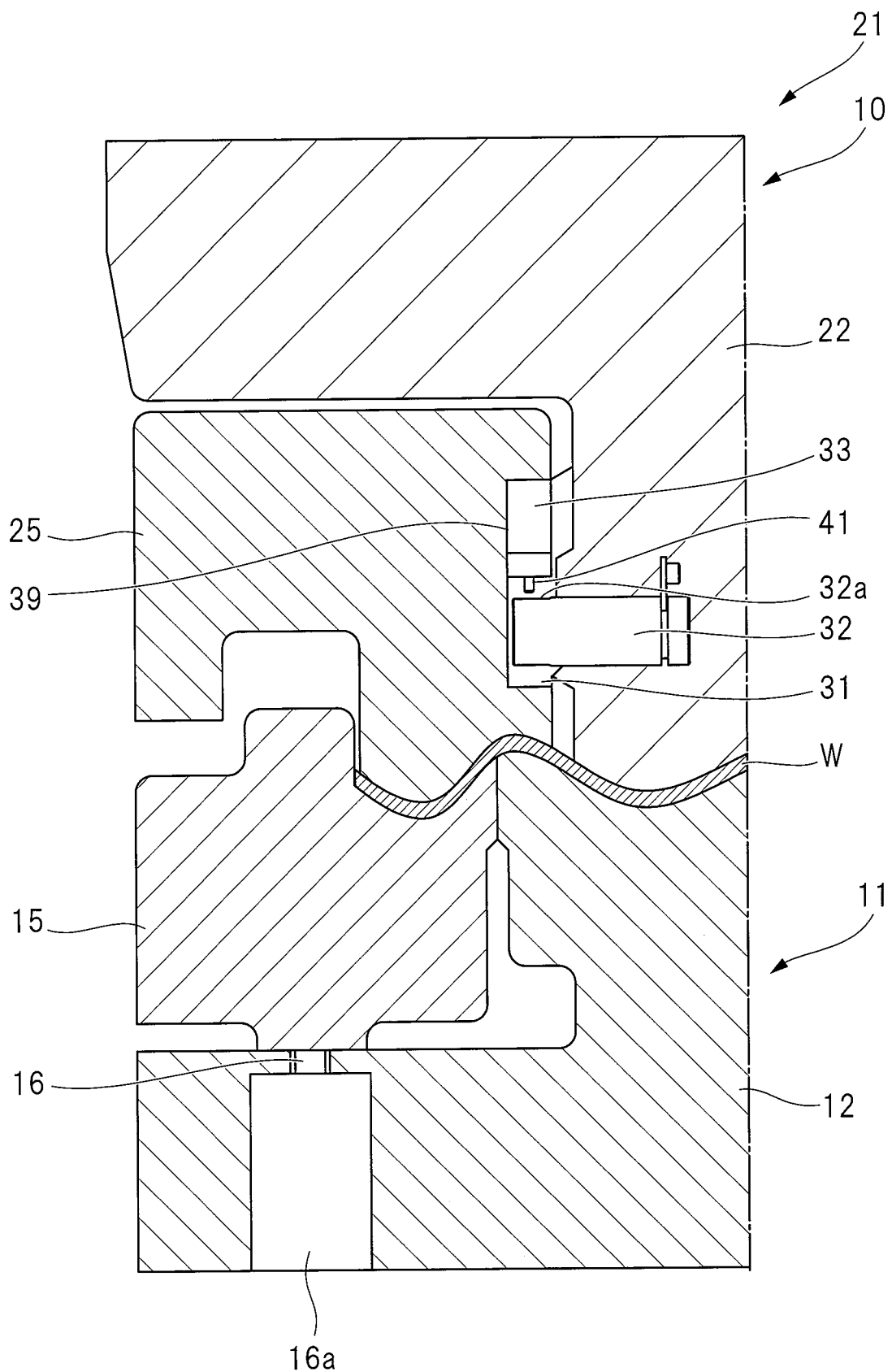
FIG. 6 is a sectional view showing a main part of a press apparatus according to another embodiment of the present invention.
Figure 7:
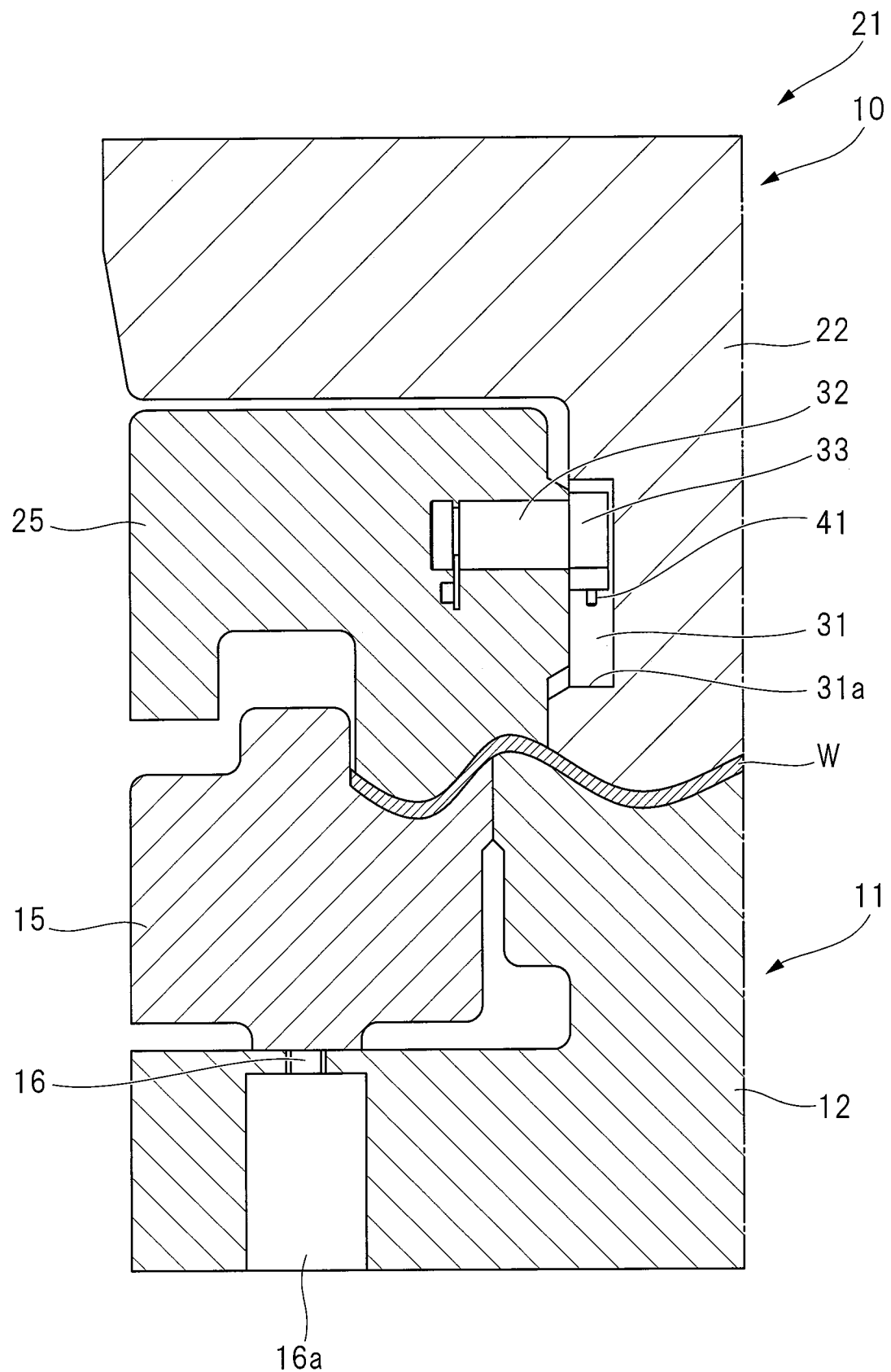
FIG. 7 is a sectional view showing a main part of a press apparatus according to still another embodiment of the present invention.
Figure 8:
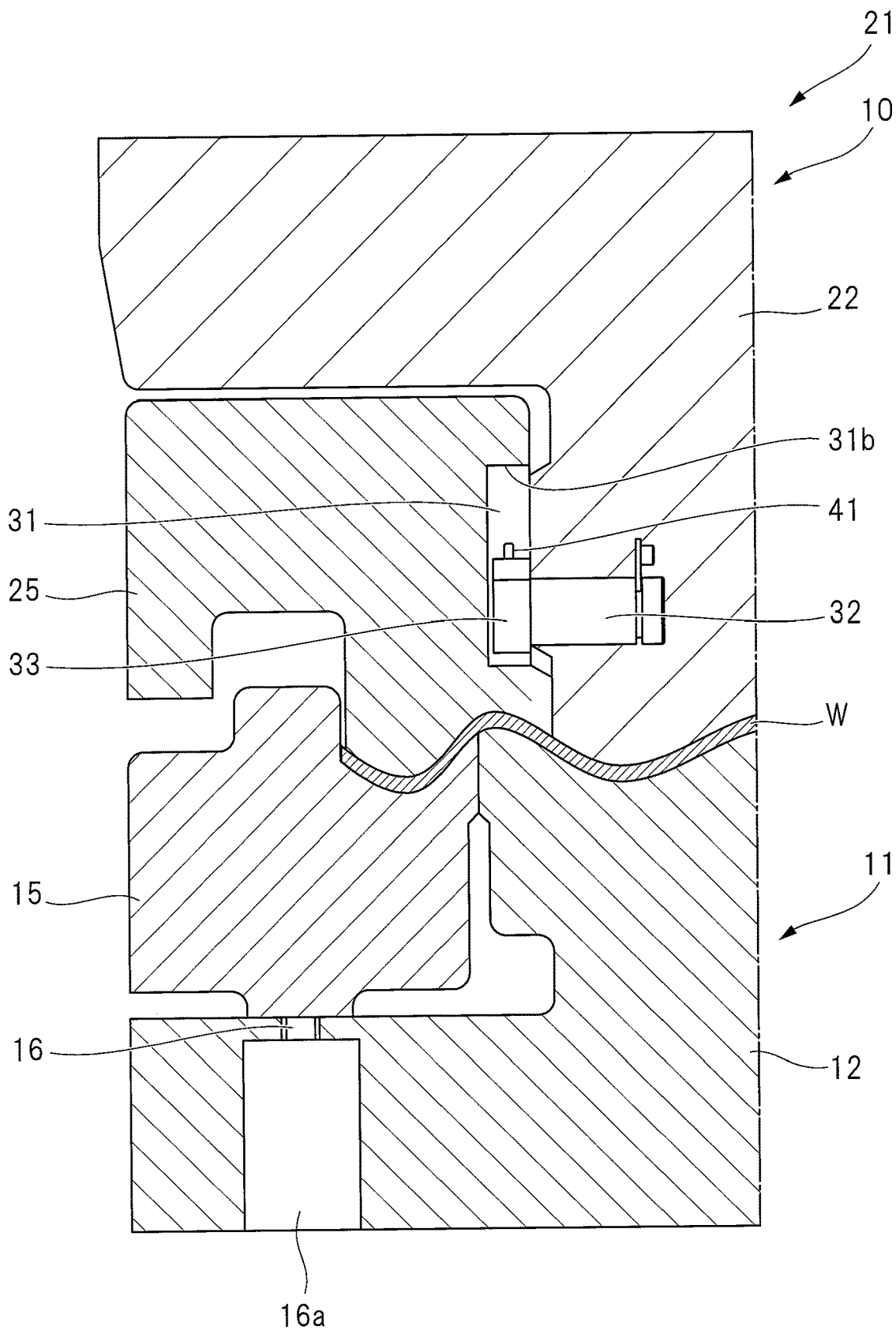
FIG. 8 is a sectional view showing a main part of a press apparatus according to still another embodiment of the present invention.

FIGS. 6 to 8 are sectional views respectively showing main parts of press apparatuses according to other embodiments of the present invention. FIGS. 6 to 8 respectively show left-side portions of the press apparatuses as shown in FIG. 1, and right-side portions have the same structures as the left-side portions.

In the press apparatus 10 shown in FIG. 6, the guide groove 31 is formed on an inner surface of the upper blank holder 25 and extends vertically; the side pin 32, which protrudes into the guide groove 31, is attached to the upper forming die 22. The shock absorber 33 is disposed inside the guide groove 31 and is located at an upper position relative to the side pin 32. The tip end portion of the shock absorber 33 faces downward. Therefore, when opening the upper and lower forming dies, the side pin 32 moves upward and abuts on the piston rod 41, an upward movement of the upper forming die 22 is transmitted to the upper blank holder 25 through the shock absorber 33, and the impact force applied to the upper blank holder 25 by the upper forming die 22 is absorbed by the shock absorber 33.

In the press apparatuses 10 shown in FIGS. 1 and 6, the guide grooves 31 are formed on either one of the upper forming die 22 and the upper blank holders 25, and the side pins 32 are provided on the other of the upper forming die 22 and the upper blank holders 25. Each side pin 32 is guided by the corresponding guide groove 31 and is movable in vertical directions, and the piston rod 41 of each shock absorber 33 is capable of abutting on the corresponding side pin 32. Each side pin 32 has the rod abutting surface 32a, and the protruding end 41a of each piston rod 41 is capable of abutting on the corresponding rod abutting surface 32a.

In the press apparatus 10 shown in FIG. 7, the side pin 32 is attached to the upper blank holder 25, the guide groove 31 is formed on the upper forming die 22, and the side pin 32 does not protrude into the guide groove 31. The shock absorber 33 is attached to a tip end surface of the side pin 32 and faces downward. A tip end surface of the piston rod 41 faces a lower end surface, or a rod abutting surface 31a, of the guide groove 31. Therefore, when opening the upper and lower forming dies, the rod abutting surface 31a moves upward and abuts on the protruding end 41a of the piston rod 41, the upward movement of the upper forming die 22 is transmitted to the upper blank holder 25 through the shock absorber 33, and the impact force applied to the upper blank holder 25 by the upper forming die 22 is absorbed by the shock absorber 33.

In the press apparatus 10 shown in FIG. 8, the side pin 32 is attached to the upper forming die 22, the guide groove 31 is formed on the upper blank holder 25, and the side pin 32 does not protrude into the guide groove 31. The shock absorber 33 is attached to the tip end surface of the side pin 32 and faces upward. The tip end surface of the piston rod 41 faces an upper end surface, or a rod abutting surface 31b, of the guide groove 31. Therefore, when opening the upper and lower forming dies, the upper forming die 22 moves upward, the protruding end 41a of the piston rod 41 abuts on the rod abutting surface 31b, the upward movement of the upper forming die 22 is transmitted to the upper blank holder 25 through the shock absorber 33, and the impact force applied to the upper blank holder 25 by the upper forming die 22 is absorbed by the shock absorber 33.

In each press apparatus 10 shown in FIGS. 7 and 8, the guide groove 31 is formed on either one of the upper forming die 22 and the upper blank holder 25, the side pin 32 is provided on the other of the upper forming die 22 and the upper blank holder 25, and the shock absorber 33 is attached to the tip end surface of the side pin 32. Thus, the protruding end 41a on the piston rod 41 of the shock absorber 33 is capable of abutting on the rod abutting surface 31a or 31b of the guide groove 31. In this manner, the side pin 32 is utilized as a member for attaching the shock absorber 33; however, the shock absorber 33 may be directly attached to either one of the upper forming die 22 and the upper blank holder 25. In this case, the shock absorber 33 is disposed at a position apart from the guide groove 31 and the side pin 32.

Figure 9:
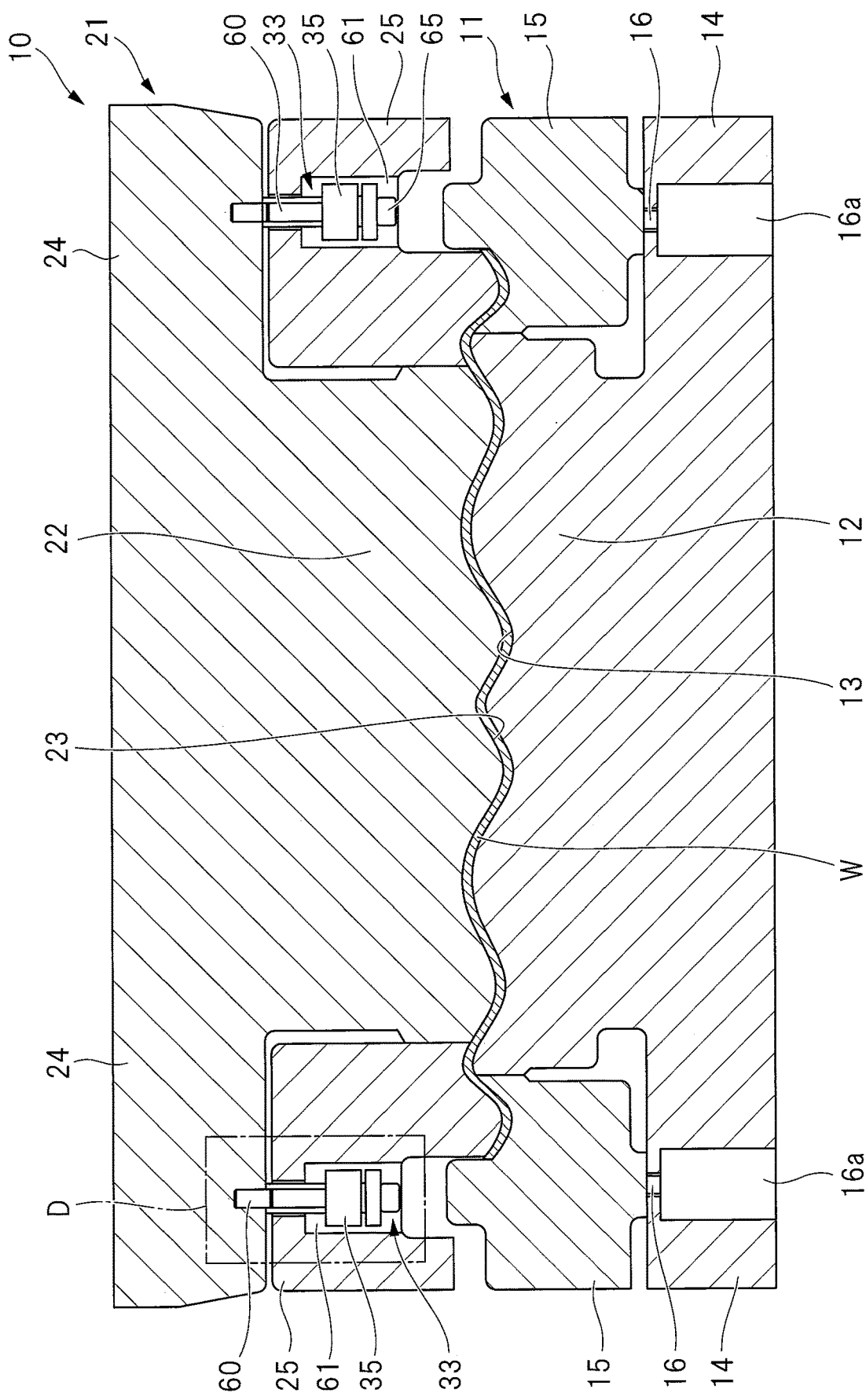
FIG. 9 is a sectional view showing a press apparatus according to still another embodiment of the present invention, with a blank being pressed by the press apparatus.
Figure 10:
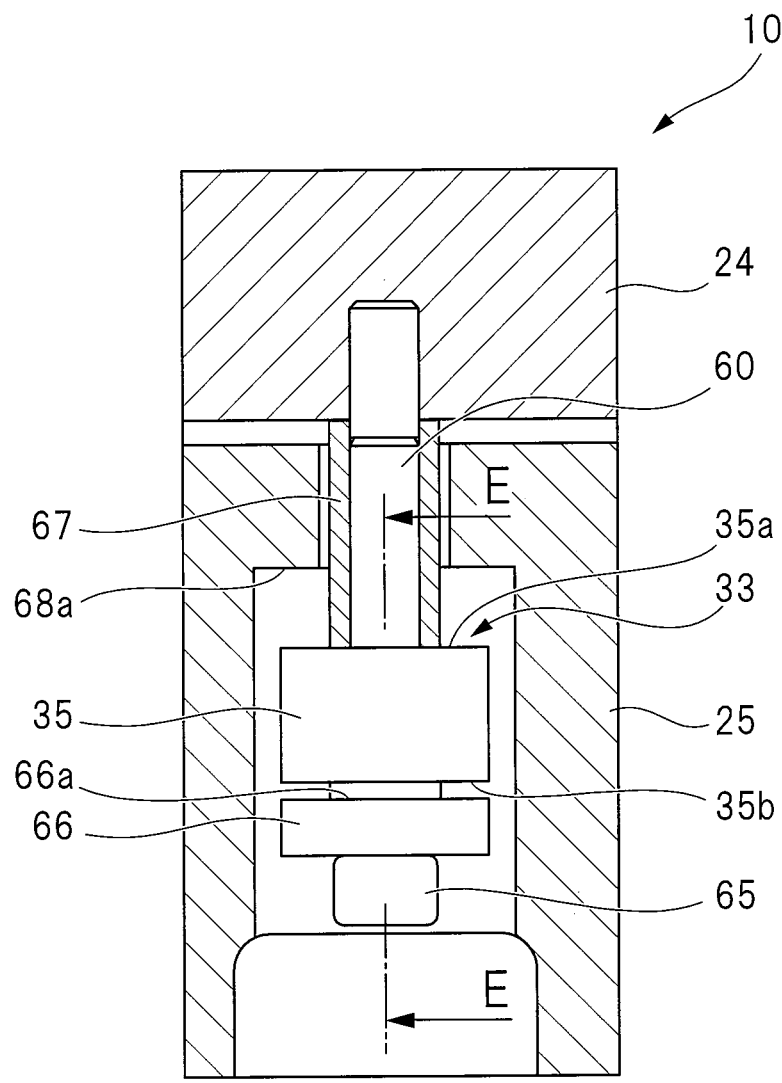
FIG. 10 is an enlarged sectional view of a portion "D" of FIG. 9.

FIG. 9 is a sectional view showing a press apparatus according to still another embodiment of the present invention, with a blank being pressed by the press apparatus. FIG. 10 is an enlarged sectional view of a portion "D" of FIG. 9, and FIG. 11 is an enlarged sectional view taken along a line E-E of FIG. 10.

As shown in FIG. 9, the lower die unit 11 has the same structure as that of the press apparatus 10 shown in FIG. 1. On the other hand, the upper die unit 21 shown in FIG. 9 has a structure in which support rods 60 are attached vertically to the respective upper holder support portions 24 that partially constitute the upper forming die 22, and the shock absorbers 33 are attached to the respective support rods 60. A retainer bolt comprising a screw portion is used as the support rod 60; however, a press-fitting pin may instead be used as the support rod 60.

Figure 11:
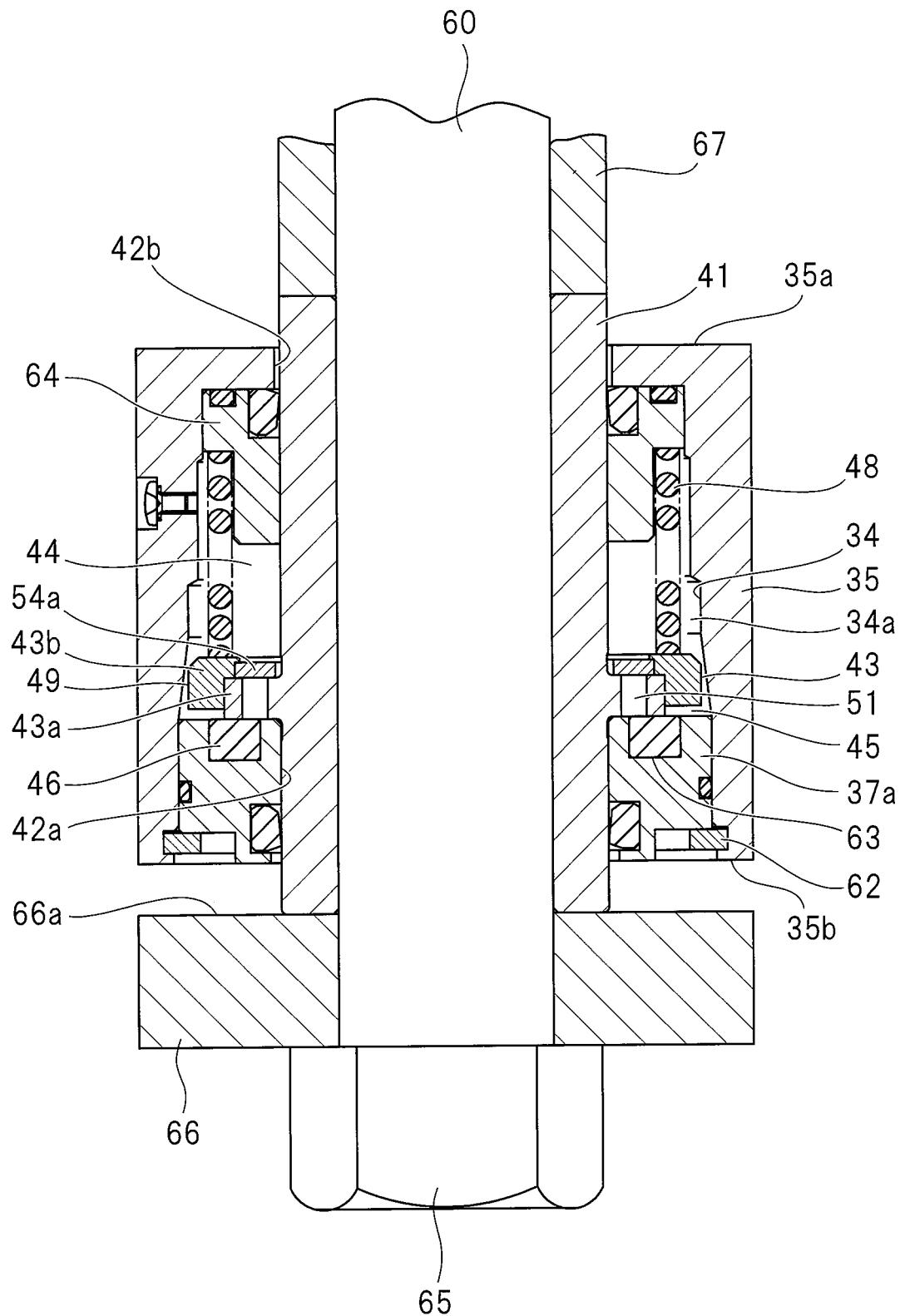
FIG. 11 is an enlarged sectional view taken along a line E-E of FIG. 10.

As shown in FIG. 11, each shock absorber 33 has a hollow piston rod 41 through which the support rod 60 extends, and is attached to the upper forming die 22 by the support rod 60. As shown in FIG. 9, each upper blank holder 25 is provided with a housing space 61, and each shock absorber 33 to be attached to the corresponding support rod 60 is disposed inside the corresponding housing space 61. The case 35 of each shock absorber 33 is cylindrical. In FIG. 11, an upper end portion of the case 35 is described as a base end portion, and a lower end portion is described as a tip end portion. A rod cover 37a is fixed to a tip end portion of the case 35 by a stop member 62, and the piston rod 41 has a tip end portion that protrudes from a through hole 42a of the rod cover 37a. The piston rod 41 has a rear end portion that protrudes from a through hole 42b formed on a base end portion of the case 35, and thus, the piston rod 41 protrudes from both end surfaces of the case 35.

The piston 43 is annular and is formed by a piston piece 43b and a flange 43a that is integrally provided on the piston rod 41. The piston 43 partitions the cylindrical hole 34 into the spring-side oil chamber 44 on the base end side of the case 35 and the accumulator-side oil chamber 45 on the tip end side of the case 35. The accumulator 46 is housed inside a housing groove 63 formed on the rod cover 37a and faces the accumulator-side oil chamber 45. The compression coil spring 48 is mounted inside the spring-side oil chamber 44. One end of the compression coil spring 48 abuts on a spring receiving member 64 provided on the base end portion of the case 35. The other end of the compression coil spring 48 abuts on the piston 43. The piston rod 41 is urged in the direction to protrude from the tip end side of the case 35 by the spring force of the compression coil spring 48. The piston 43 is provided with the communication hole 51 that extends through the piston 43, and a ring-shaped check valve 54a is provided on the piston 43. The ring-shaped check valve 54a is moved to open and close an opening portion of the communication hole 51 on the spring chamber side.

The case 35, the piston rod 41 and the like are made of metal, and have high thermal conductivity. The piston rod 41 has a cylindrical inner surface that is tightly attached to a cylindrical outer peripheral surface of the support rod 60. Therefore, even if the shock absorber 33 is frequently actuated and generates heat, the heat is quickly conducted from the piston rod 41 to the upper forming die 22 through the support rod 60, and thus, the temperature of the shock absorber 33 is prevented from rising excessively.

A support rod head portion 65 is provided on a tip end portion of the support rod 60. An abutting disc 66 having a greater diameter than the piston rod 41 is mounted on the support rod 60; an outer diameter of the abutting disc 66 is greater than an outer diameter of the piston rod 41, and is equal to an outer diameter of the case 35. A cylindrical spacer 67 is provided outside of the support rod 60. The spacer 67 has a lower end surface that abuts on an upper end surface of the piston rod 41, and an upper end surface that abuts on a lower surface of the upper holder support portion 24. In this manner, the piston rod 41 of the shock absorber 33 is sandwiched between the spacer 67 and a rod abutting surface 66a of the abutting disc 66 from above and below, respectively, and is fixed to the upper forming die 22 by the support rod 60.

When the upper forming die 22 is moved upward to open the upper and lower forming dies, the support rod 60 attached to the upper holder support portion 24 of the upper forming die 22 moves upward along with the upper forming die 22. When the upper holder support portion 24 moves upward, a die abutting surface 35a on the base end side of the case 35 abuts on an abutting surface 68a of the upper blank holder 25. Then, the case 35 moves downward relative to the piston rod 41. At this time, the case 35 moves downward against its compression coil spring 48, and the oil inside the spring-side oil chamber 44 simultaneously flows into the accumulator-side oil chamber 45 through the gap 49. Movement of the case 35 at this time is subjected to the flow resistance of the oil as well as the force of the compression coil spring 48.

The case 35 continues to move downward relative to the piston rod 41. Along with this movement, an abutting surface 35b on the tip end side of this case 35 moves toward the abutting disc 66, and when the abutting surface 35b abuts on the rod abutting surface 66a of the abutting disc 66, operation of the shock absorber 33 is stopped.

In this manner, since the movement of the case 35 is subjected to the force of the compression coil spring 48 and the flow resistance of the oil, the impact between the case 35 and the upper blank holder 25 is absorbed. Thus, the upward movement of the upper forming die 22 is transmitted to the upper blank holder 25 through the shock absorber 33 while the impact is absorbed by this shock absorber 33, and thus, the impact force when opening the upper and lower forming dies is suppressed.

Figure 12:
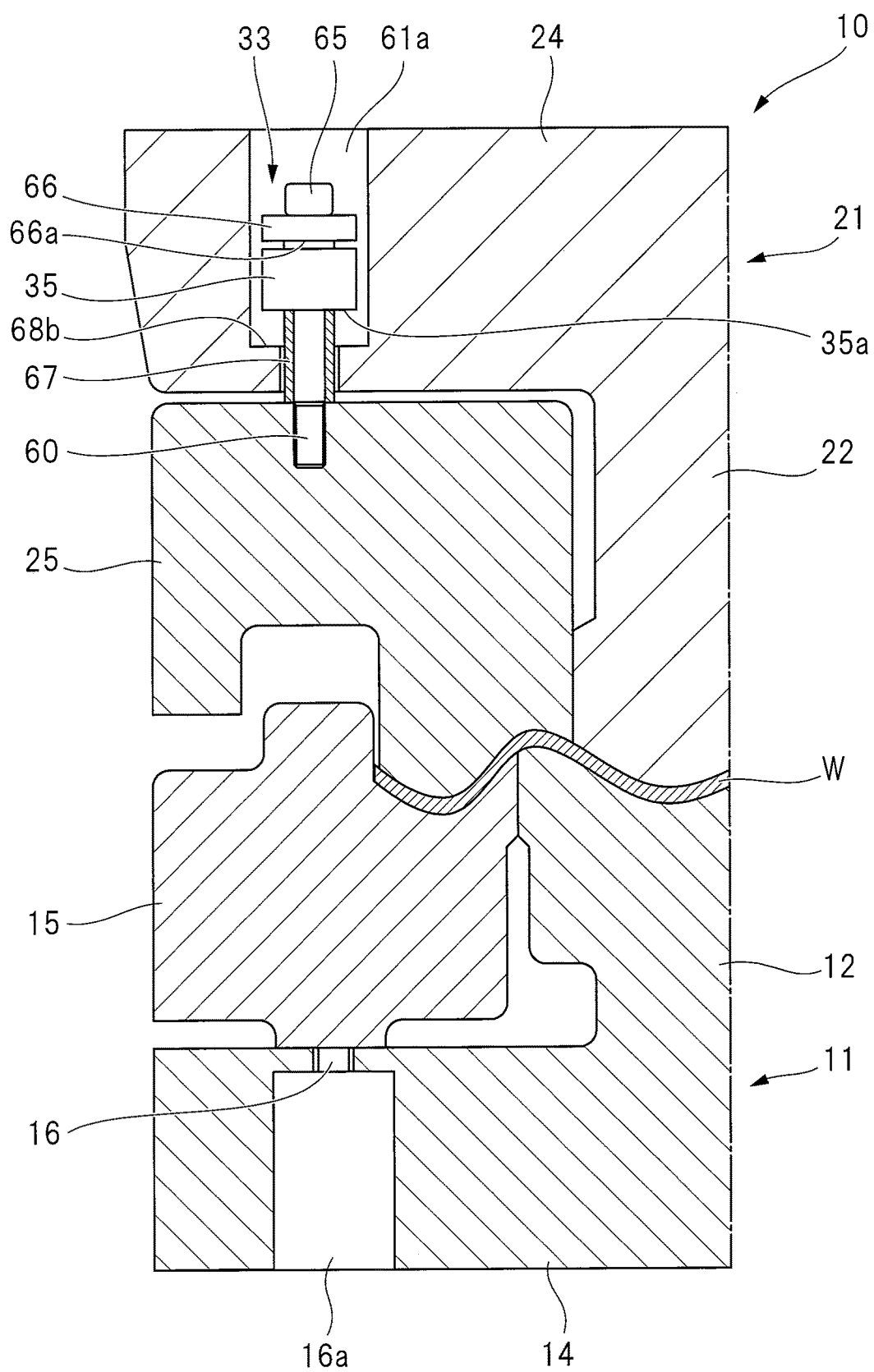
FIG. 12 is a sectional view showing a main part of a press apparatus according to still another embodiment of the present invention.

FIG. 12 is a sectional view showing a main part of a press apparatus according to still another embodiment of the present invention. FIG. 12 shows a left-side portion of the press apparatus as shown in FIG. 9, and a right-side portion has the same structure as the left-side portion.

In the press apparatus 10 shown in FIG. 12, the support rod 60 is attached to the upper blank holder 25 and extends vertically. The shock absorber 33 having the same structure as the shock absorber 33 shown in FIG. 11 is attached to the support rod 60, and the tip end portion on the piston rod 41 of the shock absorber 33 faces upward. The upper holder support portion 24 partially constituting the upper forming die 22 is provided with a housing space 61a, and the shock absorber 33 is disposed inside the housing space 61a. The tip end portion of the shock absorber 33 faces downward in the press apparatus 10 shown in FIGS. 9 and 10, whereas the tip end portion of the shock absorber 33 shown in FIG. 12 faces upward. The upper holder support portion 24 has an abutting surface 68b formed on a bottom surface of the housing space 61a, and the abutting surface 68b is capable of abutting on the die abutting surface 35a formed on a lower end surface of the case 35.

When the upper forming die 22 is moved upward to open the upper and lower forming dies, the abutting surface 68b formed on the upper holder support portion 24 of the upper forming die 22 abuts on the die abutting surface 35a on the lower end surface of the case 35, and moves this case 35 upward. Thus, the case 35 moves upward toward the abutting disc 66 relative to the piston rod 41. At this time, the case 35 moves upward against its compression coil spring 48, and the oil inside the spring-side oil chamber 44 flows into the accumulator-side oil chamber 45 through the gap 49. The movement of the case 35 at this time is subjected to the flow resistance of the oil along with the force of the compression coil spring 48.

In this manner, the movement of the case 35 is subjected to the force of the compression coil spring 48 and the flow resistance of the oil. Thus, the upward movement of the upper forming die 22 is transmitted to the upper blank holder 25 through the shock absorber 33 while the impact is absorbed by this shock absorber 33.

Figure 13:
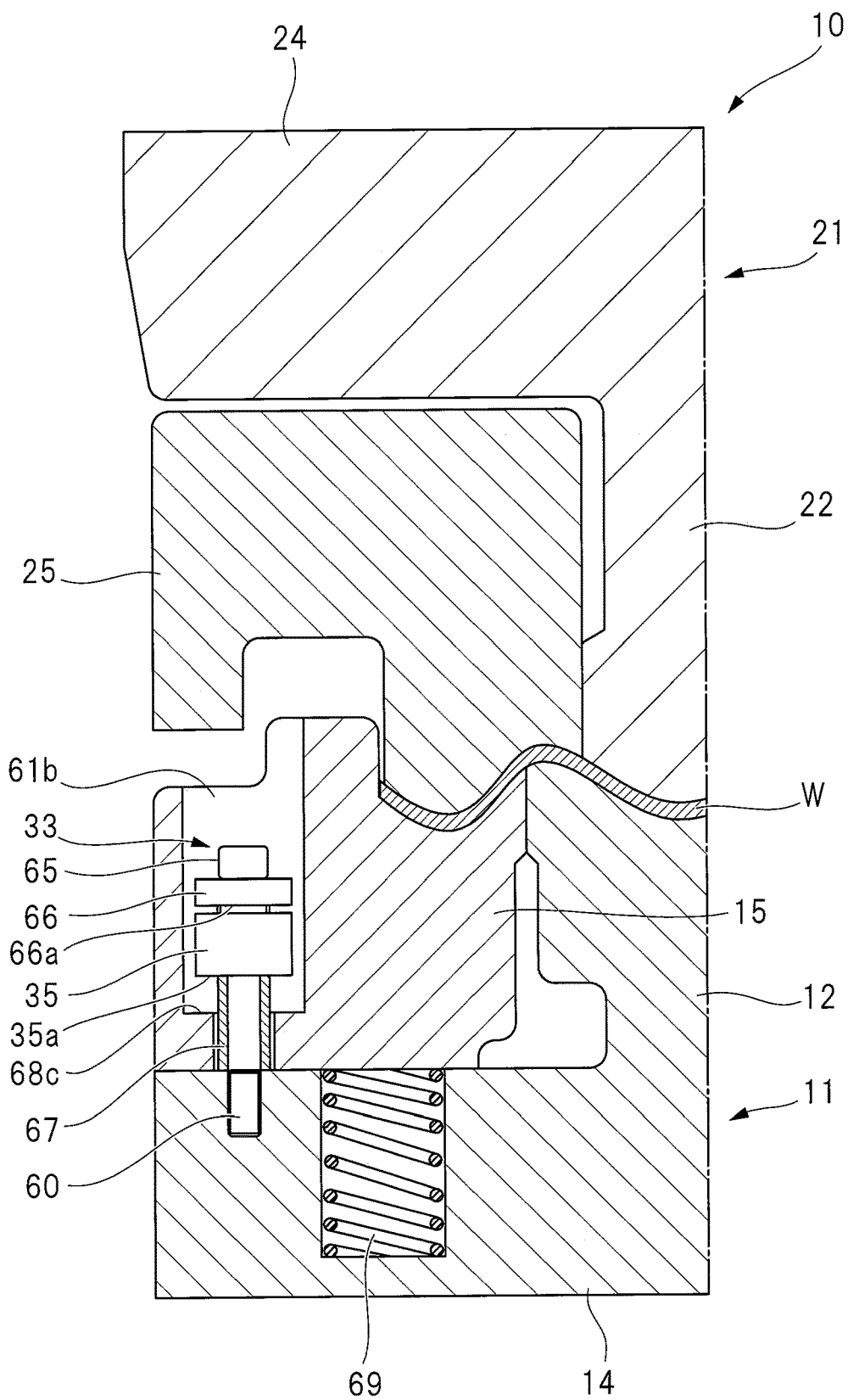
FIG. 13 is a sectional view showing a main part of a press apparatus according to still another embodiment of the present invention.

FIG. 13 is a sectional view showing a main part of a press apparatus according to still another embodiment of the present invention. In the same manner as in the above-mentioned cases, the lower die unit 11 of this press apparatus 10 has the lower forming die 12 that cooperates with the upper die unit 21 to perform press-forming on the blank "W", and the lower blank holder 15 that cooperates with the upper blank holder 25 to hold the blank "W". The lower blank holder 15 is disposed on the lower holder support portion 14 that is integral with the lower forming die 12, and the lower blank holder 15 is movable in vertical directions along the lower forming die 12. A compression coil spring 69 that serves as an elastic member is provided on the lower holder support portion 14. In this manner, the lower blank holder 15 is applied a driving force in an upward direction by the compression coil spring 69 serving as a driving means.

The support rod 60 is fixed to the lower holder support portion 14 of the lower die unit 11, the lower blank holder 15 is provided with a housing space 61b, and the shock absorber 33 is mounted on the support rod 60 and is disposed inside the housing space 61b. In this manner, the tip end portion of the shock absorber 33 shown in FIG. 13 faces upward in the same manner as in the press apparatus 10 shown in FIG. 12. An abutting surface 68c is formed on a bottom surface of the housing space 61b, and is capable of abutting on the lower end surface of the case 35.

In the press apparatus 10 shown in FIG. 13, when the upper die unit 21 is moved upward to open the upper and lower forming dies, the lower blank holder 15 is moved upward along the lower forming die 12 by an elastic force of the compression coil spring 69. When the lower blank holder 15 is moved upward, the abutting surface 68c of the lower blank holder 15 abuts on the die abutting surface 35a on the lower end surface of the case 35, and the lower blank holder 15 moves the case 35 upward. Thus, the case 35 moves upward toward the abutting disc 66 relative to the piston rod 41. At this time, the case 35 moves upward against its compression coil spring 48, and the oil inside the spring-side oil chamber 44 flows into the accumulator-side oil chamber 45 through the gap 49. The movement of the case 35 at this time is subjected to the flow resistance of the oil as well as the force of the compression coil spring 48.

In this manner, the movement of the case 35 is subjected to the force of the compression coil spring 48 and the resistance force applied by the oil. Thus, the upward movement of the lower blank holder 15 causes the impact to be absorbed by the shock absorber 33. An upward limit position of the lower blank holder 15 corresponds to a state in which a lower surface of the case 35 abuts on the abutting surface 68c, and the abutting surface 35b on an upper surface of the case 35 abuts on the rod abutting surface 66a of the abutting disc 66.

In all of the embodiments described above, the shock absorbers 33 that convert kinetic energy into thermal energy are respectively cooled by the forming dies and the blank holders through the respective cases 35 made of metal without building up excessive heat therein. Thus, durability of each shock absorber 33 is improved.

In the press apparatus 10 shown in FIG. 13, in order to apply an upward accelerating force to the lower blank holder 15, a rubber member may be adopted as driving means instead of the compression coil spring 69, or, as shown in FIG. 1, the hydraulic cylinder 16a for driving the cushion pin 16 may be provided on the lower die unit 11 as driving means. In FIG. 13, the upper die unit 21 has a structure in which the upper blank holder 25 is movable in vertical directions relative to the upper forming die 22; however, the upper die unit 21 may be of a structure in which the upper blank holder 25 and the upper forming die 22 are integral with each other.

In the press apparatus 10 shown in FIG. 13, the shock absorber 33 absorbs the impact of the lower blank holder 15; however, if the upper die unit 21 has a structure in which the upper forming die 22 and the upper blank holder 25 are members separate from each other as shown in the drawings, the shock absorber 33 may be further provided on the upper die unit 21 to absorb the impact of the upper blank holder 25, as described above.

The present invention is not to be limited to the above-mentioned embodiments, and various modifications can be made as far as they do not depart from the gist of the invention. In each press apparatus 10, the lower holder support portions 14 are integral with the lower forming die 12, and the upper holder support portions 24 are integral with the upper forming die 22; however, the lower forming die 12 may be attached to the support base, and the lower blank holders 15 may be respectively disposed on portions of the support base which protrude outward from the lower forming die 12. The upper forming die 22 may be provided in a similar manner.

The press apparatus is used for pressing a blank made of a metal sheet into a three-dimensional shape, and the shock absorber is provided on the press apparatus.

Although various embodiments of the present invention have been described and shown, the invention is not restricted thereto, but may also be embodied in other ways within the scope of the subject-matter defined in the following claims.

What is claimed is:

1. A shock absorber that is configured to be mounted on a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, the shock absorber being utilized for absorbing impact applied to the upper blank holder by the upper forming die when opening the upper and lower forming dies, the shock absorber comprising:

a case that is configured to be attached vertically to either one of the upper blank holder and the upper forming die, and having a rod cover on which a concave surface is formed;

a piston rod that is disposed inside the case, is movable inside the case, and has a protruding end capable of abutting on a rod abutting surface provided on the other of the upper blank holder and the upper forming die; and a piston that is provided on the piston rod and is movable through oil filled in the case; and a side pin that is configured to be attached horizontally to the other of the upper blank holder and the upper forming die, the rod abutting surface being formed on the side pin, wherein the concave surface forming a tip end surface of the case has a bottom portion that is provided with a through hole through which the piston rod protrudes.

2. The shock absorber according to claim 1, wherein the case has a flat attaching surface that is configured to be attached to a mounting surface provided on either one of the upper blank holder and the upper forming die.

3. A shock absorber that is configured to be mounted on a press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, the shock absorber being utilized for absorbing impact applied to the upper blank holder by the upper forming die when opening the upper and lower forming dies, the shock absorber comprising:

a support rod that is configured to be attached vertically to either one of the upper blank holder and the upper forming die;

a hollow piston rod that is fixed to the support rod and through which the support rod extends;

a case that has the hollow piston rod disposed therein such that the hollow piston rod protrudes from both ends of the case in a relaxed state of the shock absorber, the case being further provided with a die abutting surface capable of abutting on the other of the upper blank holder and the upper forming die, the case being movable relative to the hollow piston rod;

a piston that is provided on the hollow piston rod and is movable through oil filled in the case; and a rod abutting member that is mounted on a tip end of the support rod, is configured to be positioned away from the case when the shock absorber is in the relaxed state, and is configured to abut on the case when the shock absorber is in a compressed state, the rod abutting member having an outer diameter that is greater than an outer diameter of the piston rod.

4. A press apparatus comprising:

a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit, wherein the press apparatus further comprises:
- a side pin that is attached horizontally to either one of the upper blank holder or the upper forming die, and protruding into a guide groove formed on the other of the upper blank holder or the upper forming die; and
- a shock absorber that is attached to the guide groove, and abutting on the side pin when the upper die unit is moved upward away from the lower die unit to open the upper and lower forming dies after press-forming is performed on the blank so that impact applied to the upper blank holder by the upper forming die when opening the upper and lower forming dies is absorbed.

5. The press apparatus according to claim 4, wherein the shock absorber has: a case in which a piston rod is disposed and which is filled with oil; and a piston that is provided on the piston rod and is movable in the oil.

6. The press apparatus according to claim 4, wherein the shock absorber has:
- a case that is attached vertically to the other of the upper blank holder or the upper forming die, and having a rod cover on which a concave surface is formed;
- a piston rod that is disposed inside the case, is movable inside the case, and has a protruding end capable of abutting on a rod abutting surface provided on the side pin; and
- a piston that is provided on the piston rod and is movable through oil filled in the case,
- wherein the concave surface forming a tip end surface of the case has a bottom portion that is provided with a through hole through which the piston rod protrudes.

7. A press apparatus comprising: a lower die unit having a lower forming die and a lower blank holder; and an upper die unit having an upper forming die that cooperates with the lower forming die to perform press-forming on a blank and an upper blank holder that cooperates with the lower blank holder to hold the blank, the upper die unit being movable in vertical directions relative to the lower die unit;
wherein the press apparatus further comprises:
- a support rod that is attached vertically to either one of the upper blank holder and the upper forming die; and
- a shock absorber that is mounted on the support rod, and absorbing impact applied to the upper blank holder by the upper forming die when the upper die unit is moved upward away from the lower die unit to open the upper and lower forming dies after press-forming is performed on the blank,
wherein the shock absorber has: a hollow piston rod that is fixed to the support rod and through which the support rod extends;
- a case that has the hollow piston rod disposed therein such that the hollow piston rod protrudes from both ends of the case in a relaxed state of the shock absorber, the case being further provided with a die abutting surface capable of abutting on the other of the upper blank holder and the upper forming die, the case being movable relative to the hollow piston rod; and
- a piston that is provided on the hollow piston rod and is movable through oil filled in the case.

8. The press apparatus according to claim 7, further comprising:
- a rod abutting member that is mounted on a tip end of the support rod and is configured to abut on the piston rod, the rod abutting member having an outer diameter that is greater than an outer diameter of the piston rod.

9. A press apparatus comprising:
- a lower die unit having a lower forming die and a lower blank holder; and
- an upper die unit having an upper forming die that cooperates with the lower forming die to perform press-forming on a blank and an upper blank holder that cooperates with the lower blank holder to hold the blank, the upper die unit being movable in vertical directions relative to the lower die unit,
wherein the press apparatus further comprises:
- a support rod that is attached vertically to the lower forming die; and
- a shock absorber that is mounted on the support rod, and absorbing impact applied to the lower forming die by the lower blank holder when the upper die unit is moved upward away from the lower die unit to open the upper and lower forming dies after press-forming is performed on the blank,
wherein the shock absorber has:
- a hollow piston rod that is fixed to the support rod and through which the support rod extends;
- a case that has the hollow piston rod disposed therein such that the hollow piston rod protrudes from both ends of the case in a relaxed state of the shock absorber, the case being further provided with a die abutting surface capable of abutting on the lower blank holder, the case being movable relative to the hollow piston rod; and
- a piston that is provided on the hollow piston rod and is movable through oil filled in the case.

10. The press apparatus according to claim 9, further comprising:
- a rod abutting member that is mounted on a tip end of the support rod and is configured to abut on the piston rod, the rod abutting member having an outer diameter that is greater than an outer diameter of the piston rod.

* * * * *